United States Patent [19]

Kinoshita et al.

[11] 4,445,151

[45] Apr. 24, 1984

[54] VIDEO TAPE RECORDER WITH AUDIO MODE RECORDING

[75] Inventors: Takashi Kinoshita, Yamato; Yoshiki Shirochi, Urayasu; Noboru Motoyoshi, Tokyo, all of Japan

[73] Assignee: Sony Corporation, Tokyo, Japan

[21] Appl. No.: 330,874

[22] Filed: Dec. 15, 1981

[30] Foreign Application Priority Data

Dec. 17, 1980 [JP] Japan .................................. 55-178212
Jun. 15, 1981 [JP] Japan .................................. 56-91956
Jun. 15, 1981 [JP] Japan .................................. 56-91957

[51] Int. Cl.³ .......................................... H04N 5/782
[52] U.S. Cl. ....................................... 360/27; 358/341; 360/33.1; 369/49
[58] Field of Search ............... 358/323, 335, 341, 342, 358/343, 143, 144, 145, 147; 360/9.1, 10.1, 10.2, 10.3, 11.1, 19.1, 33.1, 27, 28; 369/48, 49

[56] References Cited

U.S. PATENT DOCUMENTS

| | | | |
|---|---|---|---|
| 4,013,841 | 3/1977 | Ohkubo et al. .................... | 369/49 X |
| 4,303,950 | 12/1981 | Taniguchi et al. ................. | 360/19.1 |
| 4,353,090 | 10/1982 | Broadbent ......................... | 358/342 |
| 4,356,510 | 10/1982 | Nakayama .......................... | 358/143 |
| 4,361,849 | 11/1982 | Bolger ............................. | 358/312 |
| 4,368,354 | 1/1983 | Furihata et al. .................. | 358/144 X |
| 4,390,906 | 6/1983 | Furumoto et al. .................. | 360/19.1 |

*Primary Examiner*—Donald E. McElheny, Jr.
*Attorney, Agent, or Firm*—Lewis H. Eslinger; Alvin Sinderbrand

[57] ABSTRACT

In an apparatus for recording and/or reproducing a television signal with multiplex audio signals, a pilot signal is recorded on one or both of the audio tracks of a video tape in a manner to identify the mode of the multiplex audio signals and each pilot signal is detected to establish such mode when reproducing. For example, the frequency of the pilot signal may be changed for identifying different modes of the multiplex audio signals, such as, the bilingual mode and the stereo-phonic mode, with the pilot signal of selected frequency being recorded on one of the audio tracks, or the pilot signal having a certain frequency is recorded on one of the audio tracks in the case of the bilingual mode, and on the other audio track of the tape in the case of the stereo-phonic mode. In still another embodiment, the pilot signal is recorded in both audio tracks of the tape and the phase relation of the recorded pilot signals is varied to identify the mode of the multiplex audio signals.

19 Claims, 3 Drawing Figures though on the stereo-phonic or bilingual mode. Further, in reliance on the content of the video tape, it is quite difficult to decide where to change-over the switch and, moreover, it is always possible that the playback will be started with the switch in the wrong position for the signals recorded on the tape.

VIDEO TAPE RECORDER WITH AUDIO MODE RECORDING

BACKGROUND OF THE INVENTION

1. Field of the Invention

This invention relates generally to a VTR (Video Tape Recorder), and more particularly is directed to a VTR for recording and/or reproducing a television signal with multiplex audio signals.

2. Description of the Prior Art

A television signal with multiplex audio signals includes a sub-channel signal having a frequency of 31.5 kHz as a sub-carrier and which is frequency-modulated with an audio signal, in addition to a main channel signal which is the same as the sound component of the standard television signal. The television signal with the multiplex audio signals may employ the latter for stereo-phonic or bilingual mode broadcasting.

In the case of stereo-phonic broadcasting, a signal which is the sum of right and left audio signals is transmitted in the main channel and a signal which is the difference therebetween is transmitted in the sub-channel. On receiving such main channel and sub-channel signals, the left and right audio signals are separated therefrom by a matrix circuit. On the contrary, in the case of bilingual broadcasting, a first audio signal is transmitted in the main channel and a second audio signal is transmitted in the sub-channel and these first and second audio signals are respectively derived directly from the received main channel and sub-channel signals. Therefore, on receiving bilingual broadcasting, it is necessary to dispose a switching circuit or the like in order to deliver the first and second audio signals independently, rather than to a matrix circuit, as in the case of receiving stereo-phonic broadcasting.

More specifically, on receiving a television signal with multiplex audio signals, it becomes necessary to determine whether the multiplex audio signals are for stereo-phonic or bilingual broadcasting and to correspondingly change-over the switching circuit to either include or exclude the matrix circuit in the receiving circuit.

To cope with the above, on transmitting the television signal with multiplex audio signals, a control signal of about 55.125 kHz (3.5 fH: fH being the horizontal frequency) which is AM-modulated (Amplitude Modulated) with a frequency of 982.5 Hz for the stereo-phonic mode, or with a frequency of 922.5 Hz for the bilingual mode, is multiplexed on the first and/or second audio signal. On reception of the television signal with multiplex audio signals, its control signal is detected for permitting the above described switching circuit or the like to be changed-over automatically to the required condition.

When recording a television signal with multiplex audio signals on a VTR, in the stereo-phonic mode, the left and right audio signals are obtained separately from each other by means of a matrix circuit and recorded on the tape in respective first and second audio signal tracks and, in the bilingual mode, the first and second audio signals are respectively recorded in the first and second audio signal tracks.

However, in the prior art, the previously described control signal for identifying the stereo-phonic or bilingual mode is not recorded in the audio tracks. For this reason, in case of playback of the signal recorded with the prior art VTR, it is necessary for an operator to manually change-over a switch in response to the content of the reproduced signal and, therefore, a troublesome operation is required to again obtain the broadcast television signal with multiplex audio signals in the stereo-phonic or bilingual mode. Further, in reliance on the content of the video tape, it is quite difficult to decide where to change-over the switch and, moreover, it is always possible that the playback will be started with the switch in the wrong position for the signals recorded on the tape.

OBJECTS AND SUMMARY OF THE INVENTION

Accordingly, it is an object of the present invention to provide an improved video tape recorder which avoids the above-described disadvantages of the prior art.

More specifically, it is an object of the invention to provide a video tape recorder which is capable of automatically discriminating between various modes of multiplex audio signals recorded in audio tracks of a tape.

Another object is to provide a video tape recorder which is capable of recording a television signal received with multiplex audio signals in the stereo-phonic or bilingual mode and of reproducing such signal automatiically in the form received.

According to an aspect of the present invention, in an apparatus for recording and/or reproducing a television signal with multiplex audio signals which are recorded in and/or reproduced from respective audio tracks extending longitudinally on the tape and formed separately from the video tracks, there are provided means for producing a pilot signal to be recorded in at least one of said audio tracks, and means responsive to a mode of said multiplex audio signals for determining a parameter of said pilot signal, such as, its frequency or phase, or the track in which said pilot signal is to be recorded.

The above, and other objects, features and advantages of the present invention will become apparent from the following detailed description of illustrative embodiments which is to be read in conjunction with the accompanying drawings, in which like reference numerals designate the same elements and parts.

DESCRIPTION OF THE PREFERRED EMBODIMENTS

Figure 1:
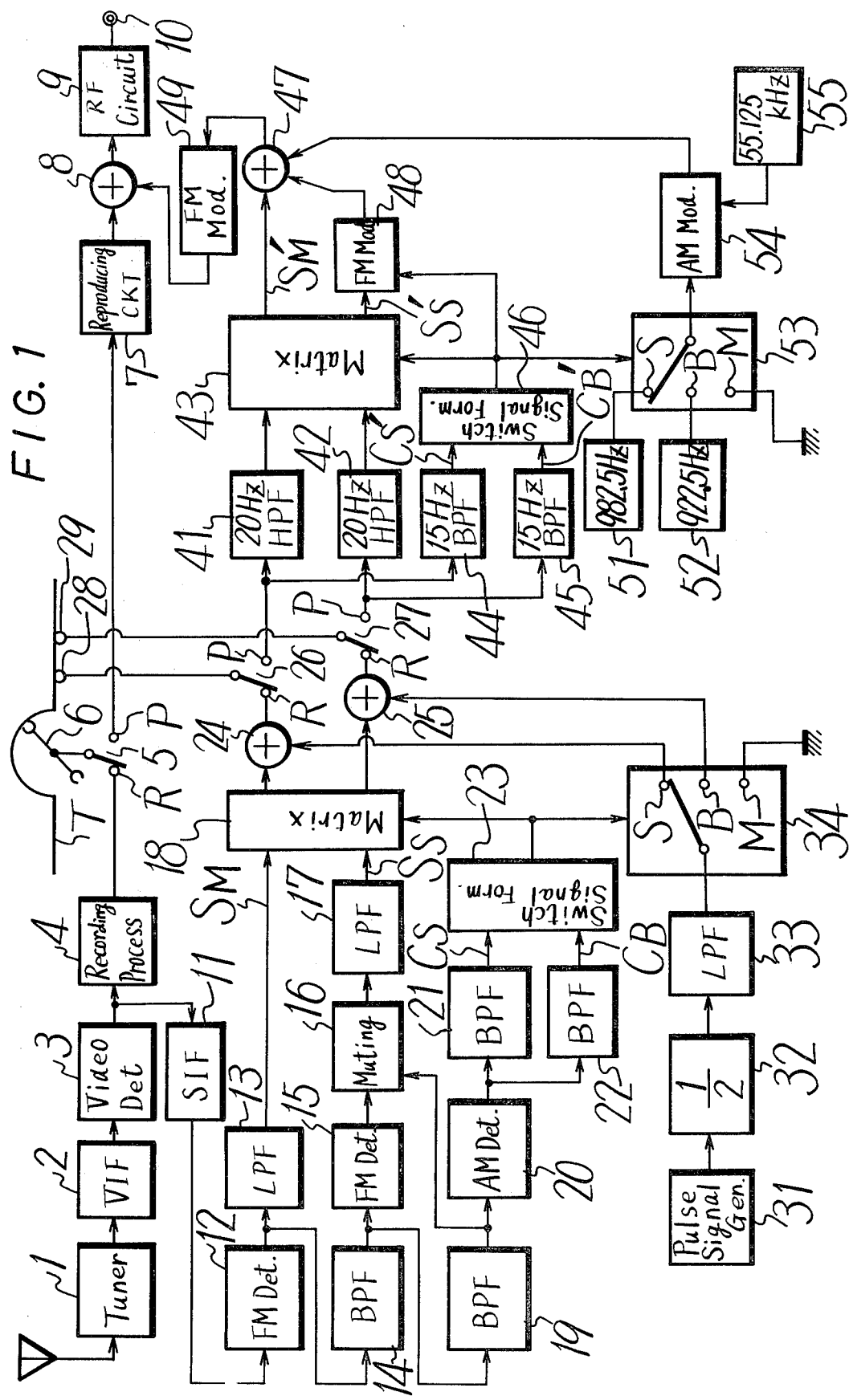
FIG. 1 is a schematic block diagram of one embodiment of a VTR according to this invention.

Referring to FIG. 1 in detail, it will be seen that, in a recording section of a VTR according to the invention as there illustrated, a television signal received in a tuner 1 is supplied, by way of a video and sound intermediate amplifying circuit 2, (VIF) to a video detecting circuit 3 in which the television signal is detected to generate a video signal and also a low-frequency (such as, 4.5 MHz) frequency modulated sound IF signal, as is well known. As is usual in a conventional VTR (video tape recorder), the video signal is supplied through a recording processing circuit 4 and a recording terminal R of a REC-PB (Record-Playback) switch 5 to a rotary magnetic head 6, by which the video signal is recorded in successive tracks extending across a tape T wrapped around a portion of the periphery of a guide drum.

The low-frequency FM sound IF signal from video detecting circuit 3 is also supplied through a sound IF amplifying circuit 11 to an FM (Frequency Modulated) audio detecting circuit or FM detector 12, from which the detected signal is delivered to a low pass filter 13 so as to produce a main channel signal $S_M$. A signal from the FM audio detecting circuit 12 is supplied by way of a band pass filter 14, having a lower cut off frequency of 16 kHz, to an FM audio detecting circuit 15, and the detected signal from the latter is supplied through a muting circuit 16 to a low pass filter 17 thereby producing a sub-channel signal $S_S$. The main and sub-channel signals $S_M$ and $S_S$ are applied to respective inputs of a matrix circuit 18.

Further, a signal from band pass filter 14 is supplied to a band pass filter 19 having a center frequency of 55.125 kHz and a signal from the band pass filter 19 is provided to an AM (Amplitude Modulated) detecting circuit or an AM detector 20 which acts to demodulate the control signal having a frequency of 982.5 Hz or 922.5 Hz. The output of AM detector 20 is delivered to narrow-band band pass filters 21 and 22 by which a control signal $C_S$ for the stereo-phonic mode and a control signal $C_B$ for the bilingual mode are respectively detected. These control signals $C_S$ and $C_B$ are supplied to a switching signal forming circuit 23 which, in response thereto, is operative to form a switching signal which is selectively characteristic of the three modes, such as, the stereo-phonic, the bilingual and the monaural modes. The switching signal is supplied to a switching control terminal of the matrix circuit 18 so as to cause the latter to operate in a manner consistent with the characteristic mode, as hereinafter described in detail. A control terminal of muting circuit 16 is supplied with an output from band pass filter 19 whereby the sub-channel signal $S_S$ is muted in the absence of any control signal multiplexed on one or the other of the multiplex audio signals received with the television signal.

Moreover, a signal which, for example, detects or indicates a rotary phase of rotary head 6, is applied from a pulse signal generator 31 to a one-half frequency dividing circuit or a one-half frequency divider 32 thereby to form a signal with a frequency of 15 Hz. This 15 Hz signal is applied to a low pass filter 33 so as to be converted to a sine wave which is delivered to a movable contact of a change-over switch 34. The switch 34 includes three fixed contacts S, B and M for the stereo-phonic mode, the bilingual mode and the monaural mode, respectively. A switching control terminal of switch 34 receives the switching signal from switching signal forming circuit 23. In the stereo-phonic mode, a mixer or mixing circuit 24 is supplied with the 15 Hz signal from contact S of switch 34; in the bilingual mode, a mixer or mixing circuit 25 is supplied with the 15 Hz signal from contact B of switch 34; and, in the monaural mode, the movable contact of switch 34 engages contact M which is grounded, that is, neither of the mixers 24 and 25 receives the 15 Hz signal. The mixers 24 and 24 are further connected to receive first and second outputs, respectively, from matrix circuit 18.

Outputs from mixers 24 and 24 are respectively supplied, by way of recording contacts R of REC-PB change-over switches 26 and 27, to magnetic heads 28 and 29 for recording thereby in first and second tracks of tape T.

When tuner 1 receives a television signal with multiplex audio signals in the stereo-phonic mode, the resulting switching signal from circuit 23 causes matrix circuit 18 to convert the sum of the left and right channel audio signals forming the main channel signal $S_M$ and the difference of the left and right channel audio signals forming the sub-channel signal $S_S$ into left and right channel audio signals which appear at the first and second outputs of matrix circuit 18 and are applied to mixers 24 and 25, respectively. When tuner 1 receives a television signal with multiplex audio signals in the bilingual mode, the corresponding switching signal from circuit 23 causes matrix circuit 18 to provide at its first and second outputs, and hence to mixers 24 and 25, the first and second audio signals, respectively, which constitute the main and sub-channel signals $S_M$ and $S_S$ applied to matrix circuit 18. Finally, when tuner 1 receives a television signal with an audio signal in the monaural mode, matrix circuit 18 receives only the main-channel signal $S_M$ and is caused, by the resulting switching signal, to provide the monaural audio signal at the first and second outputs of matrix circuit 18, and hence to mixers 24 and 25.

Accordingly, in a recording operation of the VTR, the video signal is adapted to be recorded by rotary head 6 in successive tracks extending across tape T, and the audio signal or signals are adapted to be recorded by heads 28 and 29 in the first and second audio tracks extending along the tape. During such recording in the stereo-phonic mode, the audio signals for the left and right channels are recorded in the first and second tracks, respectively, of the tape T and the 15 Hz pilot signal is multiplexed and recorded with the left channel audio signal in the first audio track. Upon recording in the bilingual mode, the first and second audio signals are recorded in the first and second audio tracks and the 15 Hz pilot signal is multiplexed and recorded with the second audio signal in the second track. Further, upon recording in the monaural mode, the audio signal of the main channel is recorded in the first and second tracks and the pilot signal is absent.

A reproducing section of the VTR of FIG. 1 will now be described. As there shown, a playback contact P of switch 5 is adapted to receive a signal reproduced by rotary head 6, and which is supplied from that contact P through a reproducing circuit 7 to a mixer 8.

Signals reproduced by magnetic heads 28 and 29 are delivered to contacts P of switches 26 and 27 and, thence, are supplied through high pass filters 41 and 42, each having a cut-off frequency of 20 Hz or more, to a matrix circuit 43. At the same time, signals from contacts P of switches 26 and 27 are supplied to band pass filters 44 and 45 each having a center frequency of 15 Hz, to pass any signals of 15 Hz that may be multiplexed and recorded on the first and second tracks, respectively. Thus, in reproducing a recorded signal of the stereo-phonic mode, a control or pilot signal $C_S'$ of 15 Hz is detected or passed by band pass filter 44. On the other hand, in reproducing a recorded signal of the bilingual mode, a control or pilot signal $C_B'$ is detected or passed by band pass filter 45. These selectively obtained control signals $C_S'$ and $C_B'$ are supplied to a switching signal forming circuit 46 so as to form switching signals which are characteristic of the stereo-phonic, the bilingual and the monaural modes, respectively. These selectively obtained switching signals are applied to a switching control terminal of matrix circuit 43.

In response to the switching signal characteristic of the stereo-phonic mode, matrix circuit 43 produces, at its first output, a main channel signal $S'_M$ which is the sum of the left and right channel audio signals from magnetic heads 28 and 29 and, at the second output of matrix circuit 43, there is simultaneously produced a sub-channel signal $S'_S$ which is the difference between such left and right channel audio signals. In response to the switching signal characteristic of the bilingual mode, the first audio signal reproduced by head 28 is produced as the main channel signal $S'_M$ at the first output of matrix circuit 43 and the second audio signal reproduced by head 29 is produced as signal $S'_S$ at the second output of circuit 43. Finally, in response to the switching signal characteristic of the monaural mode, a mixed signal obtained from both audio signals reproduced by heads 28 and 29 is provided as the signal $S'_M$ at the first output of matrix circuit 43. A mixer 47 is supplied with the main channel signal $S'_M$ from the first output of matrix circuit 43 and the sub-channel signal $S'_S$ from the second output is also applied to mixer 47 by way of an FM modulating circuit or FM modulator 48 in which the sub-channel signal $S'_S$, if any, modulates the frequency of a carrier having a frequency of 31.5 kHz. The switching signal from circuit 46 is also provided to FM modulating circuit 48 so as to reduce the modulating degree thereof in the case of the bilingual mode as compared with that for the stereo mode.

There are further provided frequency generators 51 and 52 having frequencies of 982.5 Hz and 922.5 Hz, respectively, and the signals therefrom are supplied to a stereo contact S and a bilingual contact B of a change-over switch 53. A monaural contact M of switch 53 is grounded. The switching signal from circuit 46 is supplied to a switching control terminal of switch 53.

A signal from movable contact of switch 53 is applied to an input of an AM modulating circuit 54. Modulating circuit 54 is also supplied with a signal of 55.125 kHz generated by a frequency generator 55 and which is AM-modulated in modulator 54 with the signal of the frequency of 982.5 Hz from generator 51 in the stereo-phonic mode, or with the signal of the frequency of 922.5 Hz from generator 52 in the bilingual mode. The output of modulator 54 is suppressed in the monaural mode. The mixer 47 is also supplied with any output signal from AM modulator 54. Further, the output signal from mixer 47 is supplied through an FM modulating circuit 49 to the mixer 8.

Finally, the output signal from mixer 8 is supplied to an RF (Radio Frequency) circuit 9 where it is converted to a signal suitable for television broadcasting and provided at an output terminal 10.

It will be appreciated that, in the above described reproducing system, the video signal is reproduced by rotary head 6 and the audio signals reproduced by heads 28 and 29 are matrixed, if necessary. The audio signals processed as set forth above, the control signal from modulator 54 and the video signal are mixed with one another and the resulting mixed signal is converted to the signal suitable for television broadcasting. In this embodiment, the pilot signal of 15 Hz multiplexed and recorded on the first or second audio track is detected for permitting the matrix circuit 43 and the switching circuit 53 to be changed automatically in correspondence with the mode of the recorded signal.

In other words, since a pilot signal is multiplexed and recorded on a different one of the first and second audio tracks in response to first and second respective modes of the television signal with the multiplex audio signals, the switching-over of the reproducing section of the VTR can be performed automatically by detecting the track from which the pilot signal is reproduced during playback.

Figure 2:
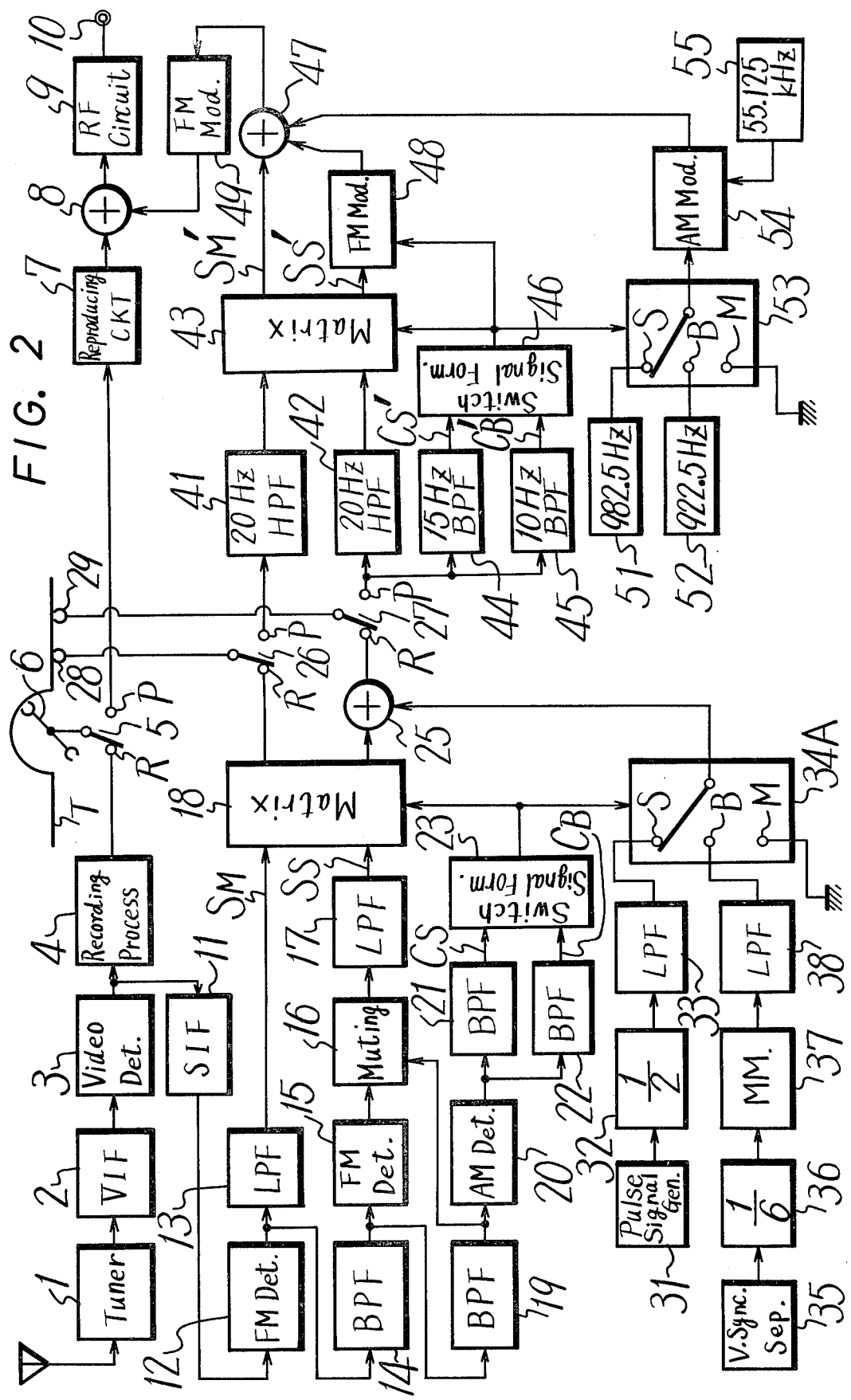
FIG. 2 is a schematic block diagram of another embodiment of a VTR according to this invention.

FIG. 2 shows another embodiment of this invention in which the same reference numbers are employed to identify circuit components corresponding to those described above with reference to FIG. 1 and the repeated explanation of such circuit components is omitted for the sake of brevity. In the embodiment of FIG. 2, the discriminating or pilot signal is recorded in only one of the audio tracks, but the frequency of that discriminating or pilot signal is different for different modes of the multiplex audio signals.

More particularly, in the embodiment of FIG. 2, the signal from pulse signal generator 31 for detecting the rotary phase of rotary head 6 is frequency-divided by two in frequency divider 32, and the resulting 15 Hz signal is delivered through low pass filter 33, and thereby converted to a sine wave, which is applied to the stereo-phonic mode contact S of a change-over switch 34A. A vertical synchronizing signal is obtained, for example, from a synchronizing separating circuit 35, and is frequency-divided by six in a dividing circuit or divider 36, with the resulting frequency divided signal being supplied to a monostable multivibrator 37 so as to form a signal or pulse of 10 Hz. The signal of 10 Hz is applied to a low pass filter 38 and thereby converted to a sine wave which is supplied to the bilingual mode contact B of change-over switch 34A. Further, the monaural mode contact B of the switch 34A is grounded. The mixing circuit or mixer 25 is supplied with a signal from a movable contact of switch 34A. A signal produced at the first output of matrix circuit 18 is applied directly to recording contact R of REC-PB change-over switch 26, and thence to magnetic head 28 for recording by the latter in the first audio track of tape T. On the other hand, a signal produced at the second output of matrix circuit 18 is applied to mixer 25 and the mixed signal from the mixer 25 is supplied through recording contact R of REC-PB change-over switch 27 to magnetic head 29 for recording by the latter in the second audio track of tape T.

Accordingly, in the recording section of the VTR shown in FIG. 2, the video signal is adapted to be recorded by rotary head 6 and the audio signal or signals are adapted to be recorded in the first and second audio tracks by heads 28 and 29, as before. However, with the embodiment of FIG. 2, in the stereo-phonic mode, the left and right channels audio signals are respectively recorded in the first and second audio tracks and the pilot signal of 15 Hz is multiplexed and recorded in the second audio track. For the bilingual mode, the first and second audio signals are respectively recorded in the first and second audio tracks of the tape and the pilot signal of 10 Hz is multiplexed and recorded in the second audio track. Further, in the monaural mode, the auido signal of the main channel is recorded in the first and second audio tracks, as in the embodiment of FIG. 1.

In the reproducing section of the embodiment illustrated in FIG. 2, video signals reproduced by rotary head 6 are delivered from reproducing contact P of switch 5 through reproducing circuit 7 to mixer 8. Also, signals reproduced from the first and second audio tracks of tape T by magnetic heads 28 and 29 are delivered from reproducing contacts P of switches 26 and 27 through high pass filters 41 and 42, each having cut-off frequency of 20 Hz or more, to matrix circuit 43. The signal from contact P of switch 27 is also supplied to band pass filters 44 and 45, having central frequencies 15 Hz and 10 Hz, respectively, so as to detect or produce a signal of 15 Hz or 10 Hz, respectively, when the same is multiplexed and recorded in the second audio track. In other words, in the stereo-phonic mode, the control or pilot signal $C_S'$ of 15 Hz is detected by band pass filter 44 and, in the bilingual mode, the control or pilot signal $C_B'$ of 10 Hz is detected by band pass filter 45. These control signals $C_S'$ and $D_B'$ are selectively supplied to switching signal forming circuit 46, by which the switching signal from the latter is made characteristic of the stereo-phonic mode, the bilingual mode and the monaural mode and then delivered to the switching control terminal of matrix circuit 43.

Matrix circuit 43 produces, at its first output, a main channel signal $S'_M$ as the sum of both left and right channel audio signals reproduced by heads 28 and 29 and, at its second output, a sub-channel $S'_S$ as the difference therebetween, for the stereo-phonic mode. For the bilingual mode, the first audio signal reproduced by head 28 is provided at the first output of matrix circuit 43, and the second audio signal reproduced by head 29 is provided at the second output. For the monaural mode, at the first output of circuit 43 is produced a mixed signal in which first and second audio signals reproduced by heads 28 and 29 are mixed with each other. The mixing circuit or mixer 47 is supplied with the main channel signal $S_M'$ from the first output of matrix circuit 43 and mixer 47 is also supplied with the sub-channel signal $S_S'$ derived from the second output of circuit 43 through FM modulator 48 having a carrier frequency of 31.5 kHz. As in the VTR of FIG. 1, a signal from switching signal forming circuit 46 is delivered to the FM modulator 48 to reduce the modulation degree for the bilingual mode relative to that for the stereo-phonic mode.

Once again, frequency generators 51 and 52 generate signals of 982.5 Hz and 922.5 Hz frequencies, respectively, which are supplied to stereo-phonic mode contact S and bilingual mode contact B of change-over switch 53, and monaural mode contact M of the latter is grounded. The switching control terminal of switch 53 receives the switching signal from circuit 46.

The AM modulator 54 is supplied with a signal selectively delivered by switch 53 and with a 55.125 kHz signal from pulse signal generator 55. The signal from generator 55 is selectively amplitude-modulated as before for the stereo-phonic mode and the bilingual mode and is suppressed for the monaural mode. The mixer 47 is supplied with the signal, if any, from modulator 54. The signal from mixer 47 is further supplied to FM modulator 49 and the output of the latter is delivered to mixer 8. Finally, the output of mixer 8 is applied to RF circuit 9 for conversion to the signal suitable for television broadcasting, which is provided at the output terminal 10.

Consequently, in the reproducing section of FIG. 2, the video signal is reproduced by the rotary head 6 and the audio signals reproduced by the heads 28 and 29 are matrixed, if necessary. The signal thus processed, the control signal from modulator 54 and the video signal are mixed with one other so as to produce the mixed signal which is converted to the television signal suitable for broadcasting. However, in the embodiment of FIG. 2, the pilot signal having a frequency of 15 Hz or 10 Hz is multiplexed and recorded in the second audio track and, upon reproducing or playback such pilot signal can be detected and its frequency determined to indicate the mode of the multiplex audio signals for allowing the matrix circuit 43 to be switched automatically.

In other words, in this embodiment, the frequency of the pilot signal is changed to indicate respective modes of the television signal with the multiplexed audio signals, and the pilot signal is multiplexed and recorded in at least one of the first and second audio tracks, so that, upon reproducing the frequency of the reproduced pilot signal can be detected to permit automatic adaptation of the reproducing section to the respective mode.

Figure 3:
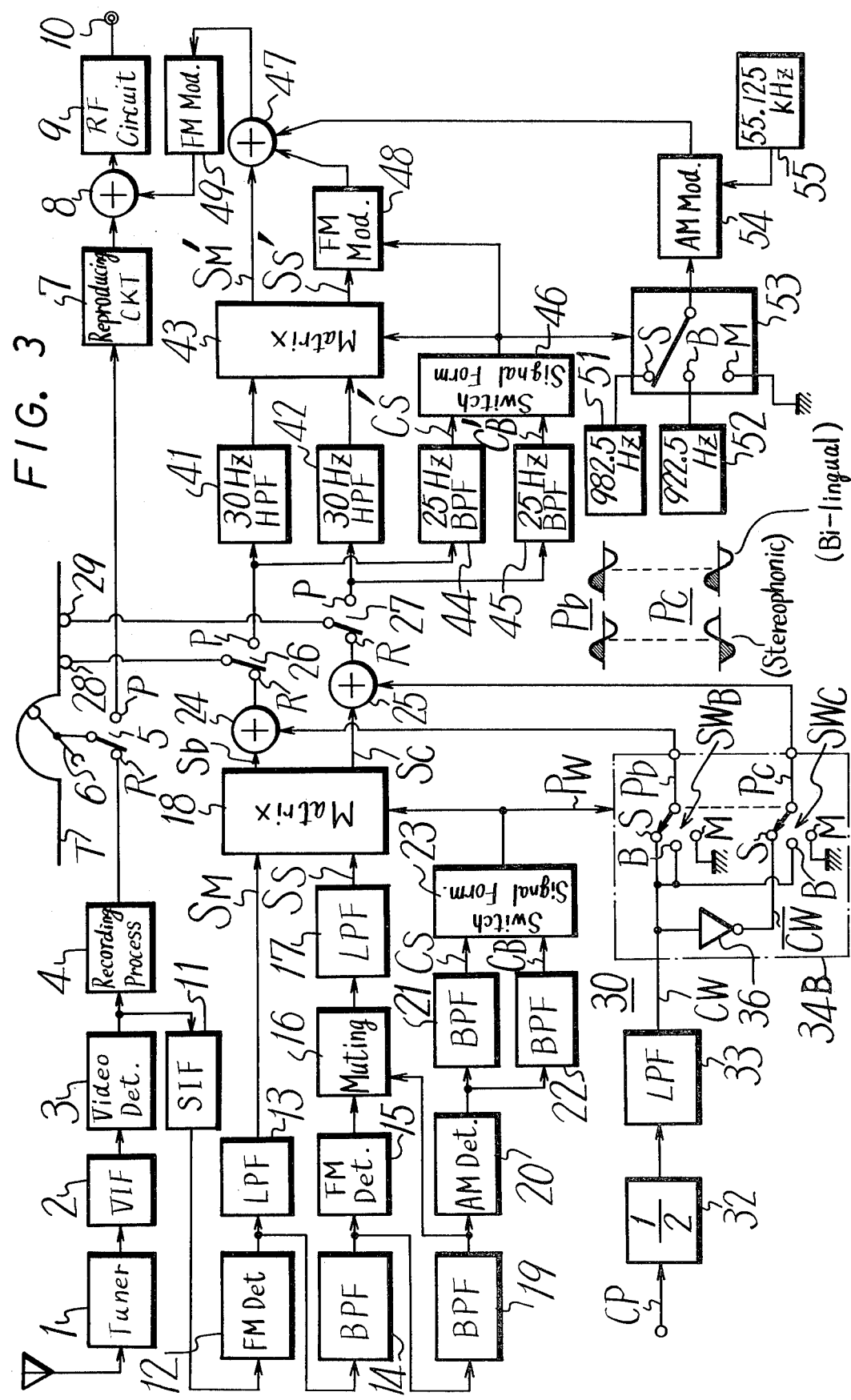
FIG. 3 is a schematic block diagram of a further embodiment of a VTR according to this invention.

In another embodiment of this invention shown on FIG. 3, pilot signals $P_b$ and $P_c$ are formed as sine wave signals each having a frequency of 30 Hz or less (for example, 25 Hz) by means of a circuit identified generally by reference numeral 30. In such embodiment, the pilot signals $P_b$ and $P_c$ are derived from a control signal CP which, in the case of a television signal of the PAL or SECAM system, has a frequency of 50 Hz and is employed as a control signal for the speed of transport of the magnetic tape T. After control signal CP is counted down or has its frequency divided by two in a counter 32, the resulting counted-down control signal of 25 Hz is smoothed in low pass filter 33 to provide a sine wave signal CW of 25 Hz which is delivered to a phase selector 34B.

The phase selector 34B is shown on FIG. 3 to include a pair of switching circuits $SW_B$ and $SW_C$, each of which is schematically illustrated as having three fixed contacts S, B and M selectively engageable by a movable contact, but it would be appreciated that, in actual practice, the switching circuits $SW_B$ and $SW_C$ will be constituted by electronic switching elements. The sine wave signal CW from low pass filter 33 is shown to be applied to the fixed contacts S and B of switching circuit $SW_B$, and also to fixed contact B of switching circuit $SW_C$. Further, the sine wave signal CW is applied to an inverter 36, and the resulting phase-inverted sine wave signal $\overline{CW}$ is applied to fixed contact S of switching circuit $SW_C$. Furthermore, fixed contacts M of both switching circuits $SW_B$ and $SW_C$ are grounded, and their movable contacts are ganged so as to be simultaneously changed-over from selective engagement with their fixed contacts S, B or M in response to a control or switching signal $P_W$ from switching signal forming circuit 23. The purpose of the changing-over of switching circuits $SW_B$ and $SW_C$ is to provide the pilot signals $P_B$ and $P_C$, which are respectively derived from their movable contacts, with a phase relationship which is indicative of the mode of the multiplex audio signals being received with a television signal at tuner 1.

More specifically, upon receiving a television signal with multiplex audio signals of the stereo-phonic mode, pilot signals $P_B$ and $P_C$ are to be of inverted or opposite phase relationship, whereas, if the multiplex audio signals received with a television signal are of the bilingual mode, pilot signals $P_b$ and $P_c$ are to have the same phase relationship. Finally, if the received television signal is accompanied by a monaural audio signal, no pilot signals $P_b$ and $P_c$ are to appear at the respective outputs of phase selector 34B.

The outputs or movable contacts of switching circuits $SW_B$ and $SW_C$ are respectively connected to mixers 24 and 25 which also receive first and second outputs $S_b$ and $S_c$, respectively, of matrix circuit 18. Preferably, the pilot signals $P_b$ and $P_c$, as applied to mixers 24 and 25 for multiplexing with audio signals derived from outputs $S_b$ and $S_c$ of matrix circuit 18 have their levels reduced a predetermined amount, for example, 30 to 40 dB less than the levels of the audio signals.

Apart from the above, the recording section of the VTR shown on FIG. 3 is similar in arrangement and operation to that of the VTR described above with reference to FIG. 1. Thus, the switching or control signal $P_W$ applied from circuit 23 to matrix circuit 18 as well as to phase selector 34B is varied in accordance with the mode of the audio signal or signals accompanying the received television signal. For example, signal $P_W$ may have a negative value to identify the stereo-phonic mode, a positive value to identify the bilingual mode, and a zero value to identify the monaural mode.

In the case of the stereo-phonic mode, matrix circuit 18 provides the left and right channel audio signals at its first and second outputs $S_b$ and $S_c$ for multiplexing, in mixers 24 and 25, respectively, with pilot signals $P_b$ and $P_c$ which, in this case, correspond to the signals CW and CW, respectively, and thus are of opposite phase. Thus, the left channel audio signal with the pilot signal $P_b$ multiplexed thereon is recorded through contact R of switch 26 and head 28 in the first audio track on tape T, while the right channel audio signal with the oppositely phased pilot signal $P_c$ multiplexed thereon is recorded through contact R of switch 27 and head 29 in the second audio track on the tape.

If the received television signal is accompanied by multiplex audio signals of tthe bilingual mode, matrix circuit 18 provides the first and second audio signals at its first and second outputs $S_b$ and $S_c$ for multiplexing, in mixers 24 and 25, respectively, with the pilot signals $P_b$ and $P_c$ which, in this case, both correspond to the signal CW, and hence are of the same phase. Accordingly, the first audio signal with the pilot signal $P_b$ multiplexed thereon is recorded through contact R of switch 26 and head 28 in the first audio track on tape T, while the second audio signal with the pilot signal $P_c$ of the same phase multiplexed thereon is recorded through contact R of switch 27 and head 29 in the second audio track on tape T.

When the received television signal is accompanied by a monaural audio signal, the pilot signals $P_b$ and $P_c$ are suppressed, that is, no pilot signals are applied from phase selector 34B to mixers 24 and 25. Therefore, the monaural audio signal which appears at each of the outputs $S_b$ and $S_c$ of matrix circuit 18 is recorded, without any pilot signal multiplexed thereon, in each of the first and second audio tracks of tape T by way of contact R of switch 26 and head 28, and by way of contact R of switch 27 and head 29, respectively.

In the reproducing section of the VTR shown in FIG. 3, video signals reproduced from the respective tracks on tape T by rotary head 6 are again supplied through contact P of switch 5 and reproducing circuit 7 to mixer 8. Signals reproduced by heads 28 and 29 from the first and second audio tracks, respectively, of tape T are delivered through contacts P of switches 26 and 27 and respective high pass filters 41 and 42, each having a cut-off frequency of at least 30 Hz, to respective inputs of matrix circuit 43. The signals reproduced by heads 28 and 29 are further supplied from contacts P of switches 26 and 27 to band pass filters 44 and 45, respectively, each having a center frequency of 25 Hz for passing any pilot signal of 25 Hz which had been multiplexed and recorded in the first and second audio tracks on the tape. More specifically, if audio signals in the stereophonic mode accompany the video signals recorded on tape T, during reproducing thereof, control signals $C_S'$ and $C_B'$ of opposite phases from each other are detected or passed by band pass filters 44 and 45 and applied to respective inputs of switching signal forming circuit 46 so that the latter provides a switching signal characteristic of the stereo-phonic mode. On the other hand, if audio signals in the bilingual mode accompany the video signals recorded on tape T, during a reproducing operation, band pass filters 44 and 45 detect control signals $C_S'$ and $C_B'$ of the same phase which cause circuit 46 to form a switching signal characteristic of the bilingual mode. Moreover, if the recorded video signals are accompanied by monaural audio, no pilot signal is multiplexed on the latter so that, on reproducing such recorded video and audio signals, band pass filters 44 and 45 do not detect or pass any control signals and, in accordance therewith, circuit 46 provides a switching signal characteristic of the monaural mode.

Apart from the foregoing, the reproducing section of the VTR shown on FIG. 3 is substantially the same in arrangement and operation to that of the VTR described above with reference to FIG. 1. Thus, the conditions of matrix circuit 43, FM modulator 48 and switch 53 are changed-over in accordance with the switching signal from circuit 46, and hence in accordance with the mode of the reproduced audio signals.

More particularly, in the case of the stereo-phonic mode, matrix circuit 43 provides, at its first output, a signal $S_M'$ which represents the sum of the left and right channel audio signals reproduced by heads 28 and 29, while, at the second output of matrix circuit 43, there is provided a signal $S_S'$ representing the difference between the reproduced left and right channel audio signals. In the bilingual mode, the main channel signal $S_M'$ provided at the first output of matrix circuit 43 is constituted by the first audio signal reproduced by head 28 and the sub-channel signal $S_S'$ provided at the second output of matrix circuit 43 is the second audio signal reproduced by head 29. In the monaural mode, the main channel signal $S_M'$ provided at the first output of matrix circuit 43 is a mixed signal formed by mixing the outputs of heads 28 and 29, and the sub-channel signal $S_S'$ is suppressed. The main channel signal $S_M'$ is applied directly from matrix circuit 43 to mixer 47, and the sub-channel signal $S_S'$, if any, is supplied from matrix circuit 43 through FM modulator 48 having a center frequency of 31.5 KHz, to mixer 47. As before, the switching signal from circuit 46 causes FM modulator 48 to provide a degree of modulation which is smaller for the bilingual mode than for the stereo-phonic mode.

AM modulator 54 receives the signal of 55.125 KHz from generator 55 and AM modulates such signal with the signal of 982.5 Hz from generator 51, when switch 53 is positioned, as shown, in correspondence to the stereo-phonic mode. In the case of the bilingual mode, the switching signal from circuit 46 causes switch 53 to engage its contact B so that AM modulator 54 then modulates the signal from generator 55 with the signal of 922.5 Hz from generator 52. In the case of the monaural mode, switch 53 is made to engage its grounded contact M and, as a result thereof, AM modulator 54 suppresses the signal from generator 55. The output, if any, from AM modulator 54 is also applied to mixer 47, and the output of the latter is frequency-modulated in FM modulator 49 for delivery to mixer 8. Finally, the output of mixer 8 is supplied to RF circuit 9 for conversion therein to a television signal suitable for broadcasting and which is delivered to output terminal 10.

It will be apprreciated that, in all of the above described VTRs according to embodiments of this invention, pilot signals are multiplexed and recorded with audio signals in the audio signal tracks of the tape in a manner which is characteristic of the mode of the audio signals accompanying the television signal to be recorded. Thus, upon reproducing, the recorded pilot signals are easily detected to identify the mode of a recorded television signal with multiplex audio signals, and to permit automatic change-over or switching of the playback circuits, as may be required for the respective mode. Further, the sine wave selected to form the pilot signals is outside of the audio band of 30 to 10,000 Hz, as indicated above, so that the audio signals are not at all influenced by the pilot signals recorded therewith, and the reliable detection of the pilot signals, and consequent automatic establishment of the necessary reproducing circuit conditions are assured.

Further, since the pilot signals are only recorded in the auido tracks of the tape and have frequencies outside of the normal audio band, tapes recorded on VTRs embodying the invention are compatible with other VTRs, that is, can be reproduced on the latter.

Although illustrative embodiments of the invention have been described in detail herein with reference to the accompanying drawings, it is to be understood that the invention is not limited to those precise embodiments, and that various changes and modifications may be effected therein by one skilled in the art without departing from the spirit or scope of the invention, as defined in the appended claims.

What is claimed is:

1. Apparatus for recording a television signal having multiplex audio signals of any one of a stereophonic mode, a bilingual mode and a monaural mode on a tape having at least two audio tracks extending longitudinally therealong for the recording of audio signals therein and video tracks separate from said audio tracks for the recording therein of video components of said television signal; said apparatus comprising means for producing a pilot signal to be recorded in at least one of said audio tracks, means for detecting the mode of the audio signals included in the television signal to be recorded, and means responsive to the detected mode of the auido signals for recording said pilot signal in a first one only of said at least two audio tracks when said means for detecting detects audio signals of a stereophonic mode, for recording the same pilot signal in a second one only of said at lest two audio tracks when said means for detecting detects audio signals of a bilingual mode, and for preventing recording of said pilot signal in said first and second ones of said at least two audio tracks when said means for detecting detects audio signals of a monaural mode.

2. Apparatus according to claim 1; further comprising first and second heads for recording audio signals in respective first and second audio tracks of the tape; and in which said means responsive to the detected mode includes switch means receiving said pilot signal and being selectively operative to supply said pilot signal to said first and second heads, respectively, and switch control means for changing-over said swtich means in response to said means for detecting.

3. Apparatus according to claim 1; in which said pilot signal has a frequency substantially below the range of said audio signals so as to avoid interference with and from the latter.

4. Apparatus according to claim 3; in which said television signal to be recorded includes a vertical synchronizing signal, and said means for producing a pilot signal operates in synchronism with said vertical synchronizing signal.

5. Apparatus according to claim 3; further comprising rotary head means for recording said video components of the television signal in said video tracks; and in which said means for producing the pilot signal includes pulse generating means operative in response to rotation of said rotary head means.

6. Apparatus for recording on a tape a television signal including video components and multiplex audio signals transmitted in a selected one of a stereophonic mode, a bilingual mode and a monaural mode in main-channel and sub-channel signals and a control signal for identifying said one mode, comprising:
   rotary head means receiving the video components of the television signal for the recording thereof in video tracks extending obliquely across the tape;
   first and second fixed heads for recording in first and second audio tracks extending longitudinally along the tape apart from said video tracks;
   means for detecting said control signal and thereby identifying said one mode;
   signal forming means responsive to the detected control signal for providing a switching signal characteristic of said one mode;
   matrix means receiving said main-channel and sub-channel signals and being conditioned by said switching signal to provide first and second audio outputs in correspondence to said one mode;
   means for applying said first and second audio outputs to said first and second fixed heads for recording by the latter in said first and second audio tracks;
   means for producing a pilot signal; and
   means responsive to said switching signal for applying said pilot signal to said first fixed head only to be recorded by the latter in the respective audio track in multiplex relation to the audio output also to be recorded in said respective audio track when said means for detecting detects said control signal identifying said stereophonic mode, for applying said pilot signal to said second fixed head only to be recorded by the latter in the respective audio track in a multiplex relation to the audio output also to be recorded in said respective audio track when said means for detecting detects said control signal identifying said bilingual mode, and for preventing said pilot signal from being supplied to said first fixed head and said second fixed head when said means for detecting detects said control signal identifying said monaural mode.

7. Apparatus according to claim 6; in which said rotary head means and said first and second fixed heads are selectively operable to reproduce signals recorded in said video tracks and in said first and second audio tracks; and further comprising means for detecting said pilot signal in the signals reproduced by said first and second fixed heads;

signal forming means responsive to the detected pilot signal for providing a reproducing switching signal characteristic of the mode to which the detected pilot signal corresponds;

reproducing matrix means receiving said first and second audio outputs, as reproduced by said first and second fixed heads, and being conditioned by said reproducing switching signal to provide main-channel and sub-channel signals consistent with the mode of the audio signals in the original television signal;

control signal forming means also conditioned by said reproducing switching signal to provide a reconstituted control signal for identifying said one mode of the original television signal; and means for combining the reproduced output of said rotary head means, the main and sub-channel signals from said reproducing matrix means and said reconstituted control signal in a reproduced television signal.

8. Apparatus for recording a television signal having multiplex audio signals of any one at least a stereophonic mode and a bilingual mode on a tape having two audio tracks extending longitudinally therealong for the recording of audio signals therein and video tracks separate from said audio tracks for the recording therein of the video components of said television signal; said apparatus comprising means for producing a pilot signal to be recorded in at least one of said audio tracks, means for detecting the mode of the audio signals included in the television signal to be recorded, and means responsive to the detected mode of the audio signals for recording said pilot signal in both of said audio tracks with a first predetermined phase relation between said pilot signals recorded in both of said audio tracks when said means for detecting detects audio signals of a stereophonic mode and for recording said pilot signal in both of said audio tracks with a second, different predetermined phase relation between said pilot signals recorded in both of said audio tracks when said means for detecting detects audio signals of a bilingual mode.

9. Apparatus according to claim 8; further comprising first and second heads for recording audio signals in respective first and second audio tracks of the tape; and in which said means responsive to the detected mode includes phase inverting means receiving said pilot signal from said means for producing the latter to provide a phase-inverted pilot signal, switching means for selectively supplying said pilot signal and said phase-inverted pilot signal to said first and second heads, and switch control means for changing-over said switching means in response to said detected mode so that pilot signals of the same phase are recorded in said first and second audio tracks for one of said stereophonic mode and bilingual mode of the audio signals and pilot signals of opposite phases are recorded in said first and second audio tracks for the other of said stereophonic mode and bilingual mode of the audio signals.

10. Apparatus according to claim 8; in which said pilot signal has a frequency substantially below the range of said audio signals so as to avoid interference with and from the latter.

11. Apparatus according to claim 10; in which said television signal to be recorded includes a vertical synchronizing signal, and said means for producing a pilot signal operates in synchronism with said vertical synchronizing signal.

12. Apparatus according to claim 10; further comprising rotary head means for recording said video components of the television signal in said video tracks; and in which said means for producing the pilot signal includes pulse generating means operative in response to rotation of said rotary head means.

13. Apparatus according to claim 8; further comprising means for suppressing said pilot signal in response to the detection of a monaural mode of said audio signals.

14. Apparatus for recording on a tape a television signal including video components and multiplex audio signals transmitted in a selected one of at least a stereophonic mode and a bilingual mode in main-channel and sub-channel signals and a control signal for identifying said one mode, comprising:

rotary head means receiving the video components of the television signal for the recording thereof in video tracks extending obliquely across the tape;

first and second fixed heads for recording in first and second audio tracks extending longitudinally along the tape apart from said video tracks;

means for detecting said control signal and thereby identifying said one mode;

signal forming means responsive to the detected control signal for providing a switching signal characteristic of said one mode;

matrix means receiving said main-channel and sub-channel signals and being conditioned by said switching signal to provide first and second audio outputs in correspondence to said one mode;

means for applying said first and second audio outputs to said first and second fixed heads for recording by the latter in said first and second audio tracks;

means for producing a pilot signal; and means responsive to said switching signal for applying said pilot signal to both of said first and second fixed heads with a first predetermined phase relation between said pilot signals applied to both of said first and second fixed heads to be recorded by the latter in the respective audio tracks in multiplex relation to the audio outputs also to be recorded in said respective audio tracks and for applying said pilot signal to both of said first and second fixed heads with a second, different predetermined phase relation between said pilot signals applied to both of said first and second fixed heads to be recorded by the latter in the respective audio tracks in multiplex relation to the audio outputs also to be recorded in the respective audio tracks.

15. Apparatus according to claim 14; in which said means responsive to said switching signal includes phase inverting means receiving said pilot signal to provide therefrom a phase-inverted pilot signal, and switching means controlled by said switching signal for selectively supplying the first-mentioned pilot signal and said phase-inverted pilot signal to said first and second heads so that pilot signals of the same phase are recorded in said first and second audio tracks for one of said stereophonic mode and bilingual mode of the audio signals and pilot signals of opposite phases are recorded in said first and second audio tracks for the other of said stereophonic mode and bilingual mode of the audio signals.

16. Apparatus according to claim 14; further comprising means responsive to said switching signal for suppressing the application of said pilot signal to either of said fixed heads when the mode of the audio signals is monaural.

17. Apparatus according to claim 14; in which said rotary head means and said first and second fixed heads are selectively operable to reproduce signals recorded in said video tracks and in said first and second audio tracks; and further comprising means for detecting said pilot signal in the signals reproduced by said first and second fixed heads;

signal forming means responsive to the detected pilot signal for providing a reproducing switching signal characteristic of the mode to which the detected pilot signal corresponds;

reproducing matrix means receiving said first and second audio outputs, as reproduced by said first and second fixed heads, and being conditioned by said reproducing switching signal to provide main-channel and sub-channel signals consistent with the mode of the audio signals in the original television signal;

control signal forming means also conditioned by said reproducing switching signal to provide a reconstituted control signal for identifying said one mode of the original television signal; and means for combining the reproduced output of said rotary head means, the main and sub-channel signals from said reproducing matrix means and said reconstituted control signal in a reproduced television signal.

18. Apparatus according to claim 17; further comprising means responsive to the first mentioned switching signal for suppressing the application of said pilot sinal to either of said fixed heads when the mode of the audio signals is monaural.

19. Apparatus according to claim 17; in which said means responsive to the first mentioned switching signal includes phase inverting means receiving said pilot signal to provide therefrom a phase-inverted pilot signal; and switching means controlled by said first switching signal for selectively supplying the first-mentioned pilot signal and said phase-inverted pilot signal to said first and second heads so that pilot signals of the same phase are recorded in said first and second audio tracks for one of said stereophonic mode and bilingual mode of the audio signals and pilot signals of opposite phases are recorded in said first and second audio tracks for the other of said stereophonic mode and bilingual mode of the audio signals.

* * * * *